(12) United States Patent
Hui et al.

(10) Patent No.: US 9,602,379 B2
(45) Date of Patent: Mar. 21, 2017

(54) REAL-TIME ROUTE SELECTION BASED-ON ESTIMATED TRANSMISSION OVERHEAD

(71) Applicant: Cisco Technology, Inc., San Jose, CA (US)

(72) Inventors: Jonathan W. Hui, Belmont, CA (US); Jean-Philippe Vasseur, Saint Martin d'Uriage (FR); Wei Hong, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 301 days.

(21) Appl. No.: 14/336,623

(22) Filed: Jul. 21, 2014

(65) Prior Publication Data

US 2016/0021009 A1    Jan. 21, 2016

(51) Int. Cl.
| | | |
|---|---|---|
| *H04L 12/803* | (2013.01) | |
| *H04L 12/26* | (2006.01) | |
| *H04L 12/801* | (2013.01) | |
| *H04L 12/721* | (2013.01) | |

(52) U.S. Cl.
CPC ........ *H04L 43/0876* (2013.01); *H04L 45/123* (2013.01); *H04L 47/11* (2013.01); *H04L 47/125* (2013.01)

(58) Field of Classification Search
CPC ... H04L 47/125; H04L 47/11; H04L 43/0876; H04L 45/123
See application file for complete search history.

(56) References Cited

U.S. PATENT DOCUMENTS

| | | | |
|---|---|---|---|
| 8,335,164 B2 | 12/2012 | Liu | |
| 8,861,390 B2 | 10/2014 | Hui et al. | |
| 9,020,008 B2 | 4/2015 | Hui et al. | |
| 2005/0213557 A1* | 9/2005 | Hwang | H04L 29/06027 370/351 |
| 2007/0183317 A1* | 8/2007 | Vasseur | H04J 3/14 370/225 |
| 2013/0028104 A1* | 1/2013 | Hui | H04L 45/48 370/252 |
| 2014/0029445 A1 | 1/2014 | Hui et al. | |

OTHER PUBLICATIONS

Vasseur et al., "Routing Metrics Used for Path Calculation in Low-Power and Lossy Networks", Internet Engineering Task Force (IETF), Mar. 2012, pp. 1-30.

* cited by examiner

*Primary Examiner* — Omar Ghowrwal
(74) *Attorney, Agent, or Firm* — Parker Ibrahim & Berg LLC; James M. Behmke; Stephen D. LeBarron

(57) ABSTRACT

In one embodiment, one or more neighboring nodes that neighbor a sending node in a channel-hopping network are determined. Each neighboring node has multiple channels on which a data packet can be received at a particular time according to a channel-hopping receive schedule. Then, a currently active channel of each neighboring node is determined, where a data packet can be received on the currently active channel at the current time. A channel quality of the currently active channel of each neighboring node is computed, and based on the computations, a transmission overhead is estimated for communicating with each neighboring node. A data packet can then be transmitted to the neighboring node that provides a path that minimizes the estimated transmission overhead.

25 Claims, 15 Drawing Sheets

| NEIGHBORING NODE ID | CURRENTLY ACTIVE CHANNEL | CHANNEL QUALITY |
|---|---|---|
| 11 | $f_6$ | ETX = 1.23 |
| 12 | $f_5$ | ETX = 1.07 |
| 13 | $f_{10}$ | ETX = 1.51 |

FIG. 7

| NEIGHBORING NODE ID | CURRENTLY ACTIVE CHANNEL | CHANNEL QUALITY |
|---|---|---|
| 22 | $f_9$ | ETX = 1.19 |
| 23 | $f_{17}$ | ETX = 1.68 |

FIG. 11

REAL-TIME ROUTE SELECTION BASED-ON ESTIMATED TRANSMISSION OVERHEAD

TECHNICAL FIELD

The present disclosure relates generally to computer networks, and, more particularly, to real-time route selection based on estimated transmission overhead.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

Existing LLNs often use a channel-hopping link layer. This requirement is driven both by regulatory compliance and providing better spectral efficiency. One challenge with channel-hopping is that the channel conditions can vary greatly depending on the actual channel used to transmit a packet. A number of mechanisms may be used to combat varying channel conditions, including changing data rates, modulation, code rates, transmit power, etc. In general, with all of these mechanisms, higher transmission overhead is incurred when the channel conditions become worse. Transmission overhead may be quantified in terms of the transmission time, channel utilization, interference range, and so forth, required to communicate a packet to the intended receiver.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 7 illustrates a first example scenario of active channel qualities;

FIG. 11 illustrates a second example scenario of active channel qualities;

DESCRIPTION OF EXAMPLE EMBODIMENTS

Overview

Figure 1:
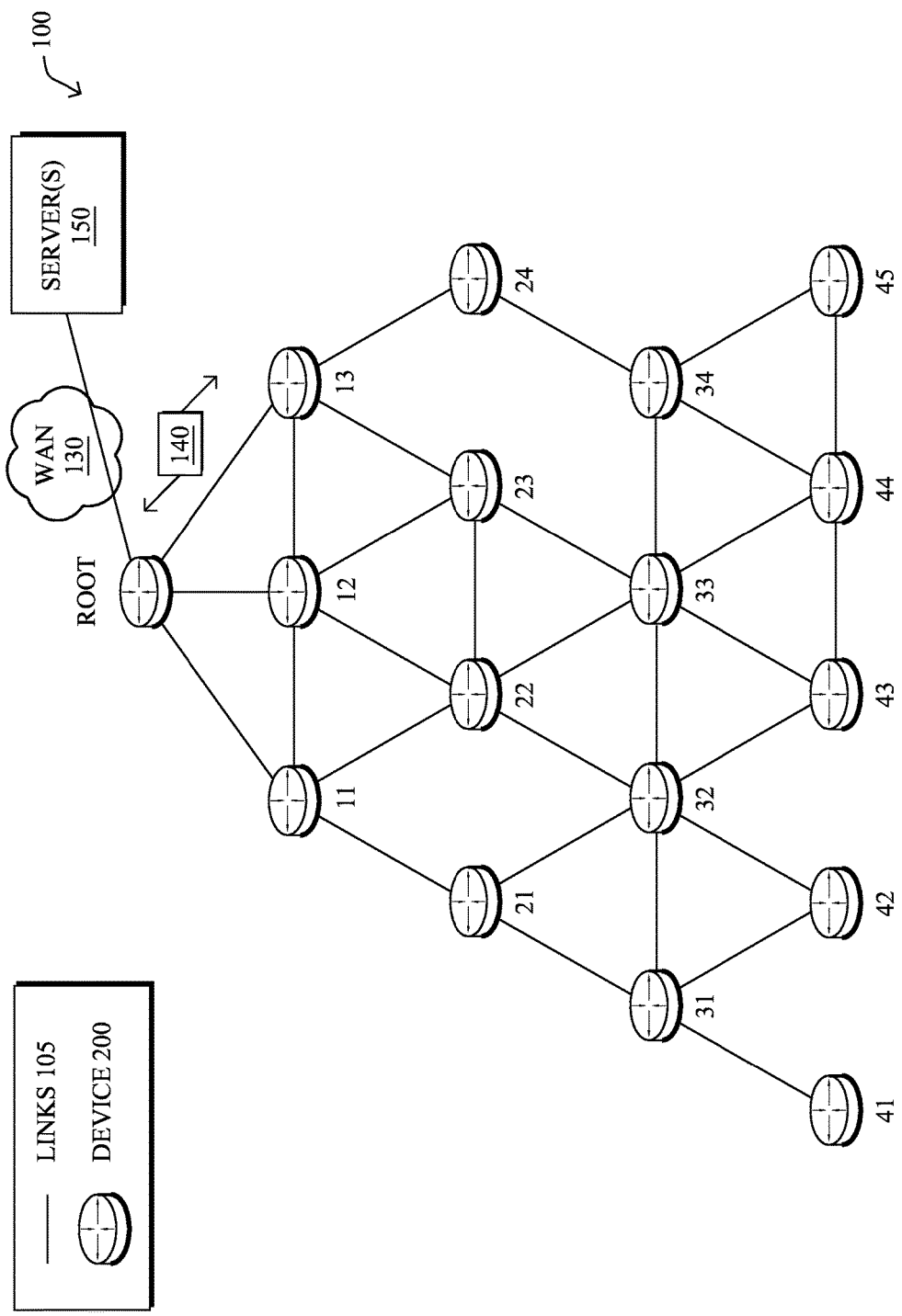
FIG. 1 illustrates an example communication network.

According to one or more embodiments of the disclosure, one or more neighboring nodes that neighbor a sending node in a channel-hopping network are determined. Each neighboring node has multiple channels on which a data packet can be received at a particular time according to a channel-hopping receive schedule. Then, a currently active channel of each neighboring node is determined, where a data packet can be received on the currently active channel at the current time. A channel quality of the currently active channel of each neighboring node is computed, and based on the computations, a transmission overhead is estimated for communicating with each neighboring node. A data packet can then be transmitted to the neighboring node that provides a path that minimizes the estimated transmission overhead.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP®) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, Wi-Fi®, Bluetooth®, etc.), PLC protocols, or other shared-media protocols where appropriate. In this context, a protocol consists of a set of rules defining how the nodes interact with each other.

Figure 2:
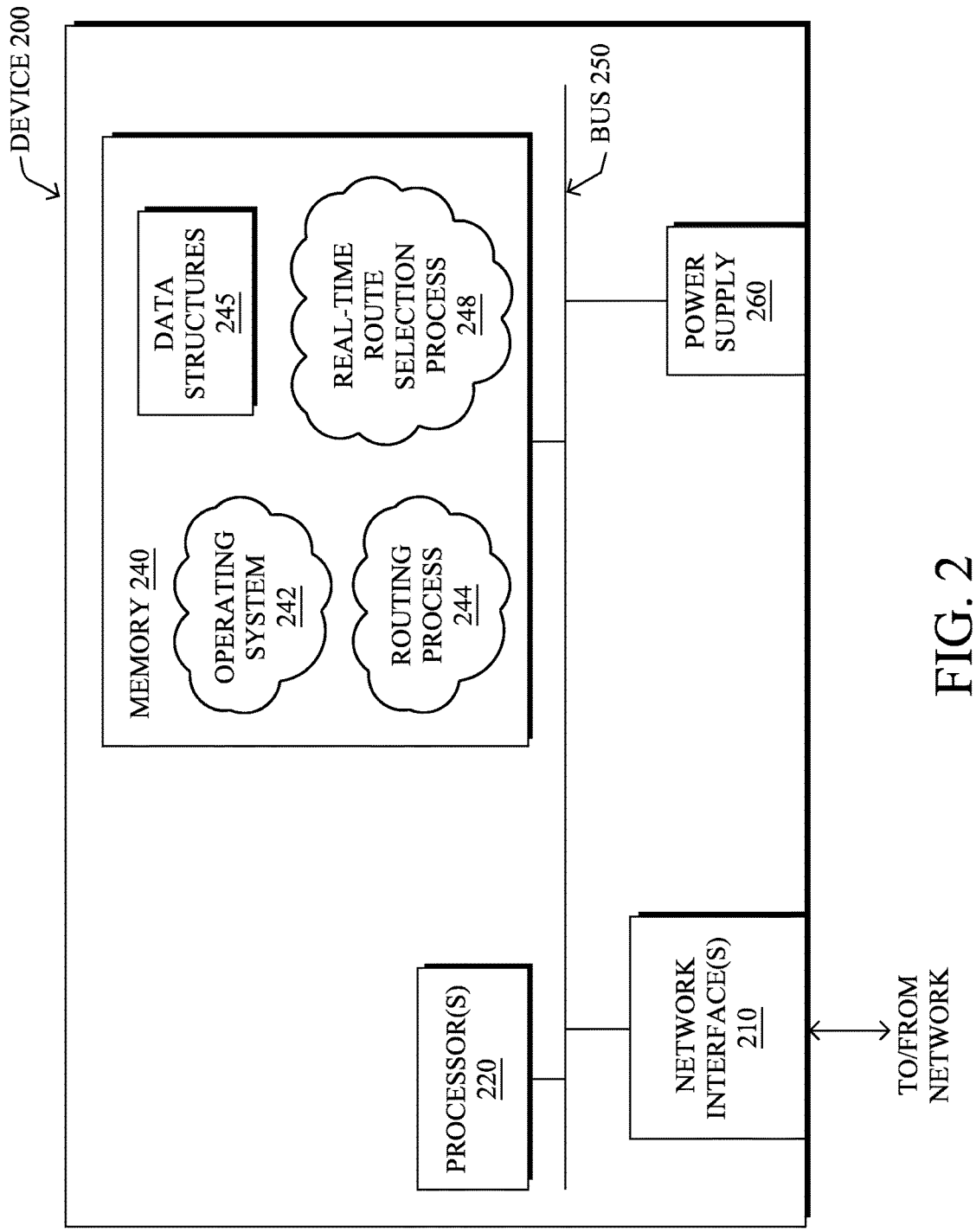
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "real-time route selection" process 248, which may be configured depending upon the particular node/device within the network 100 with functionality ranging from intelligent learning machine processes to merely communicating with intelligent learning machines, as described herein. Note also that while the real-time route selection process 248 is shown in centralized memory 240, alternative embodiments provide for the process to be specifically operated within the network interfaces 210.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which the routers, or more generally, the devices, have access to reduced resources, e.g., processing power, memory, and/or energy (battery). Also, their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

In many cases, LLN devices communicate using a frequency-hopping, or channel-hopping, link layer (the terms "frequency" and "channel" may be used interchangeably herein). This approach may be driven both by regulatory compliance and the fact that channel-hopping systems offer better spectral efficiency. Frequency-hopping, also referred to as "frequency-hopping spread spectrum" (FHSS), is a method of transmitting radio signals by rapidly switching a carrier among numerous frequency channels, e.g., using a pseudorandom sequence known to both transmitter and receiver. For example, frequency-hopping may be utilized as a multiple access method in the frequency-hopping code division multiple access (FH-CDMA) scheme. Generally, as may be appreciated by those skilled in the art, transmission using frequency-hopping is different from a fixed-frequency transmission in that frequency-hopped transmissions are resistant to interference and are difficult to intercept. Accordingly, frequency-hopping transmission is a useful technique for many applications, such as sensor networks, LLNs, military applications, etc.

Figure 3:
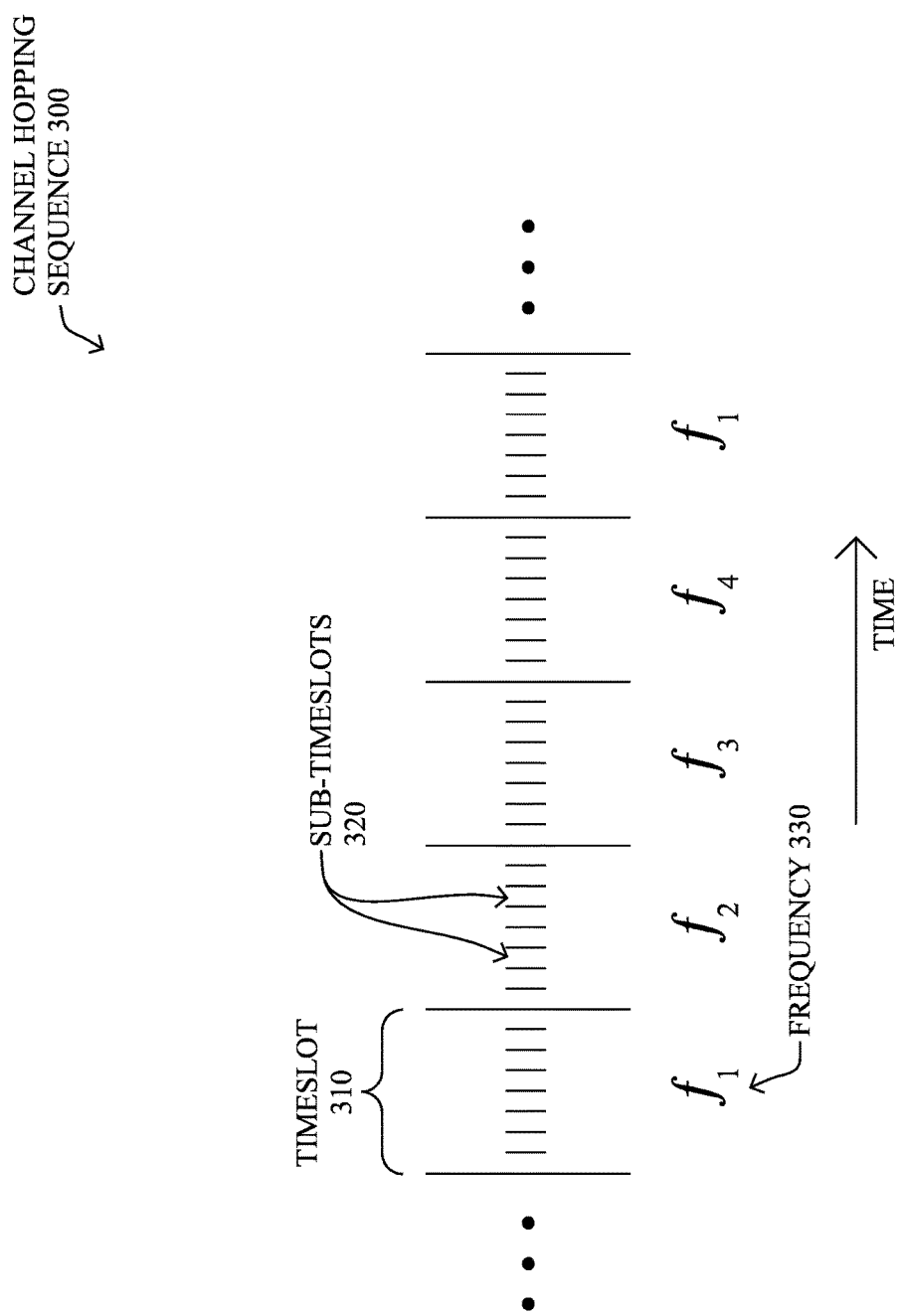
FIG. 3 illustrates an example channel-hopping sequence.

In general, as shown in FIG. 3, in frequency-hopping wireless networks, time frames are divided within a frequency-hopping sequence 300 into regular timeslots 310, each one operating on a different frequency 330 (e.g., $f_1$-$f_4$). A reference clock may be provided for the time frames for an entire network (e.g., mesh/cell), or at least between pairs of communicating devices. A MAC layer 212 of each node 200 divides time into timeslots that are aligned with the timeslot boundary of its neighbor. Also, each timeslot 310 may be further divided into sub-timeslots 320. (Note that not all frequency-hopping systems use sub-timeslots, and devices can begin transmission at any time within a timeslot; the view herein is merely one example.) Illustratively, the MAC layer 212 is in charge of scheduling the timeslot in which a packet is sent, the main objective of which generally being randomization of the transmission time in order to avoid collisions with neighbors' packets. Note that the MAC layer 212 must not only schedule the data messages coming from upper layers of a protocol stack, but it also must schedule its own packets (e.g., acknowledgements, requests, beacons, etc.).

A device in the frequency-hopping network configures its receiver to follow a hopping schedule by picking a channel/frequency sequence, duration of each timeslot, and time base that defines when the first slot in the schedule begins. To then communicate a packet, the transmitter and receiver must be configured to the same channel/frequency during the packet transmission, i.e., synchronized. All devices in a given network may utilize the same hopping schedule (i.e., all devices are configured to use the same channel sequence, time slot duration, and a common time base), resulting in a network where all communication in the network at any given point in time utilizes the same channel. Alternatively, each transmitter-receiver pair may utilize different hopping schedules (i.e., each pair may differ in channel sequence, time slot duration, and/or time base), such that transmitter-receiver pairs may communicate at the same time but on different channels. Moreover, timeslots between different devices can, in fact, be out-of-phase, and may have no relationship with each other. The latter approach may be preferable, at times, as it can add to the overall robustness and versatility of the communication network.

Figure 4:
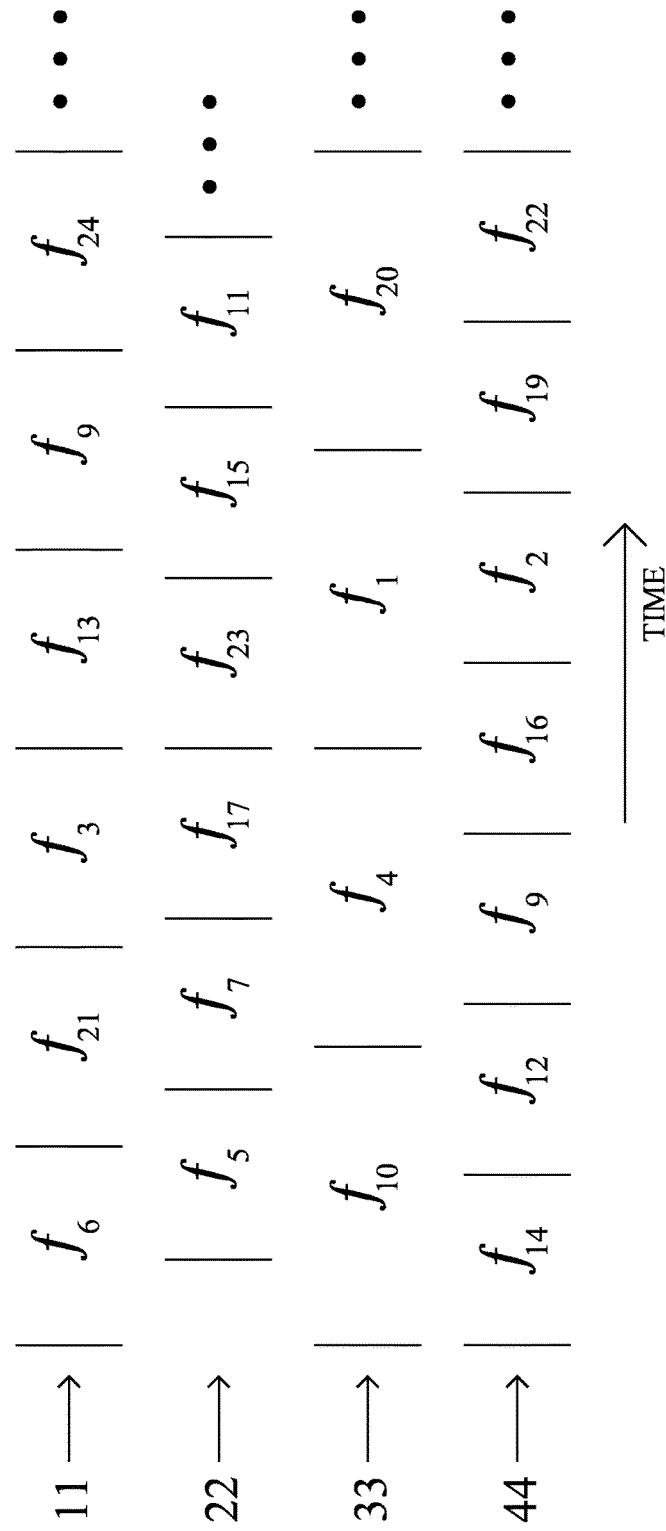
FIG. 4 illustrates example independently determined and independently timed channel-hopping sequences.

FIG. 4 illustrates an example of independently determined local unicast listening schedules 400 that may be independently computed by each individual device, "11," "22," "33," and "44," respectively. A device synchronizes its listening, or "hopping," schedule with another device by communicating its channel sequence, time slot duration, and current time within the schedule. Hopping schedule parameters may be communicated in explicit synchronization packets and/or piggybacked on existing data packets. As mentioned, some of these parameters (e.g., channel sequence) may be network-wide and implicit. Devices store these parameters to know what channel to use for transmission at a particular time.

However, it is possible that devices may not know the addresses of neighboring devices. Therefore, link-layer broadcast communication may be necessary, as it does not require any synchronization to communicate with neighboring devices. For example, IEEE 802.15.4 Enhanced Beacon Requests (EBRs) and Enhanced Beacons (EBs) are used by devices to discover neighboring networks. This type of broadcast communication is considered "asynchronous," since the network devices are not synchronized to a common channel schedule.

As noted above, one challenge with channel-hopping is that the channel conditions can vary greatly depending on the actual channel used to transmit a packet. A number of mechanisms may be used to combat varying channel conditions, including changing data rates, modulation, code rates, transmit power, etc. In general, with all of these mechanisms, higher transmission overhead is incurred when the channel conditions become worse. Transmission overhead may be quantified, for example, in terms of the transmission time, channel utilization, interference range, and so forth, required to communicate a packet to the intended receiver.

Transmission overhead may be further quantified using routing metrics, such as the Estimated Transmission Overhead (ETO) routing metric that is the Estimated Transmission Count (ETX) divided by the data rate. The sum of ETO for each link along a path may be used as the routing metric. One downside of this approach is that the ETO must necessarily take all channels into account. Thus, a link with good ETO may still have one or two channels that experience poor channel quality if all the other channels provide good channel quality.

Because a transmitter must follow the receiver's channel-hopping schedule, the transmitter will incur high transmission overhead whenever it attempts to transmit on a channel that experiences poor channel quality. To this point, it is not rare to find a few very poor quality channels among a set of available channels. In long paths made of several hops, the probability of encountering one or more poor quality channel becomes relatively high, leading to poor path ETX, even though because of its aggregated nature, the path was selected based on the aggregated link ETX. One solution to this issue is by delaying transmission until a different channel (i.e., one with good channel quality) becomes active, but doing so increases communication latency.

Real-Time Route Selection Based on Estimated Transmission Overhead

The techniques herein provide for minimizing communication latency while also attempting to minimize transmission overhead. The disclosed embodiments involve: (i) having a device maintain per-channel transmission overhead estimates to multiple next-hop routes towards a destination, (ii) selecting a next-hop route in real-time based on the current receiver parameters as determined by the receiver's channel hopping schedule, (iii) including the proportion of "bad" channels in a DAG discovery request (e.g., DIO) message to affect upwards routes from Node→FAR, and (iv) including the proportion of "bad" channels in a DAG discovery reply (e.g., DAO) message to affect downward routes from FAR→Node. This is in contrast to existing approaches that select a preferred next-hop route based on an aggregate routing metric and simply delay packet transmission if a given channel does not provide good link quality.

Specifically, according to one or more embodiments of the disclosure as described in detail below, one or more neighboring nodes that neighbor a sending node in a channel-hopping network are determined. Each neighboring node has multiple channels on which a data packet can be received at a particular time according to a channel-hopping receive schedule. Then, a currently active channel of each neighboring node is determined, where a data packet can be received on the currently active channel at the current time. A channel quality of the currently active channel of each neighboring node is computed, and based on the computations, a transmission overhead is estimated for communicating with each neighboring node. A data packet can then be transmitted to the neighboring node that provides a path that minimizes the estimated transmission overhead.

Illustratively, the techniques described herein may be performed by hardware, software, and/or firmware, such as in accordance with the "real-time route selection" process 248, which may contain computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various wireless communication protocols or IEEE 802.15.4g-2012-based protocols, and as such, may be processed by similar components understood in the art that execute those protocols, accordingly.

Operationally, the disclosed embodiments take advantage of mesh topology, where devices typically have multiple next-hop routes towards a destination. That is, rather than simply maintaining a single next-hop route to a destination, devices maintain multiple next-hop routes to a destination, and the channel conditions for each channel to those next-hop routes may be calculated. Given the set of channels that are currently active for the intended receivers, a device may estimate the transmission overhead and then select the appropriate next-hop route for forwarding the packet.

Figure 5:
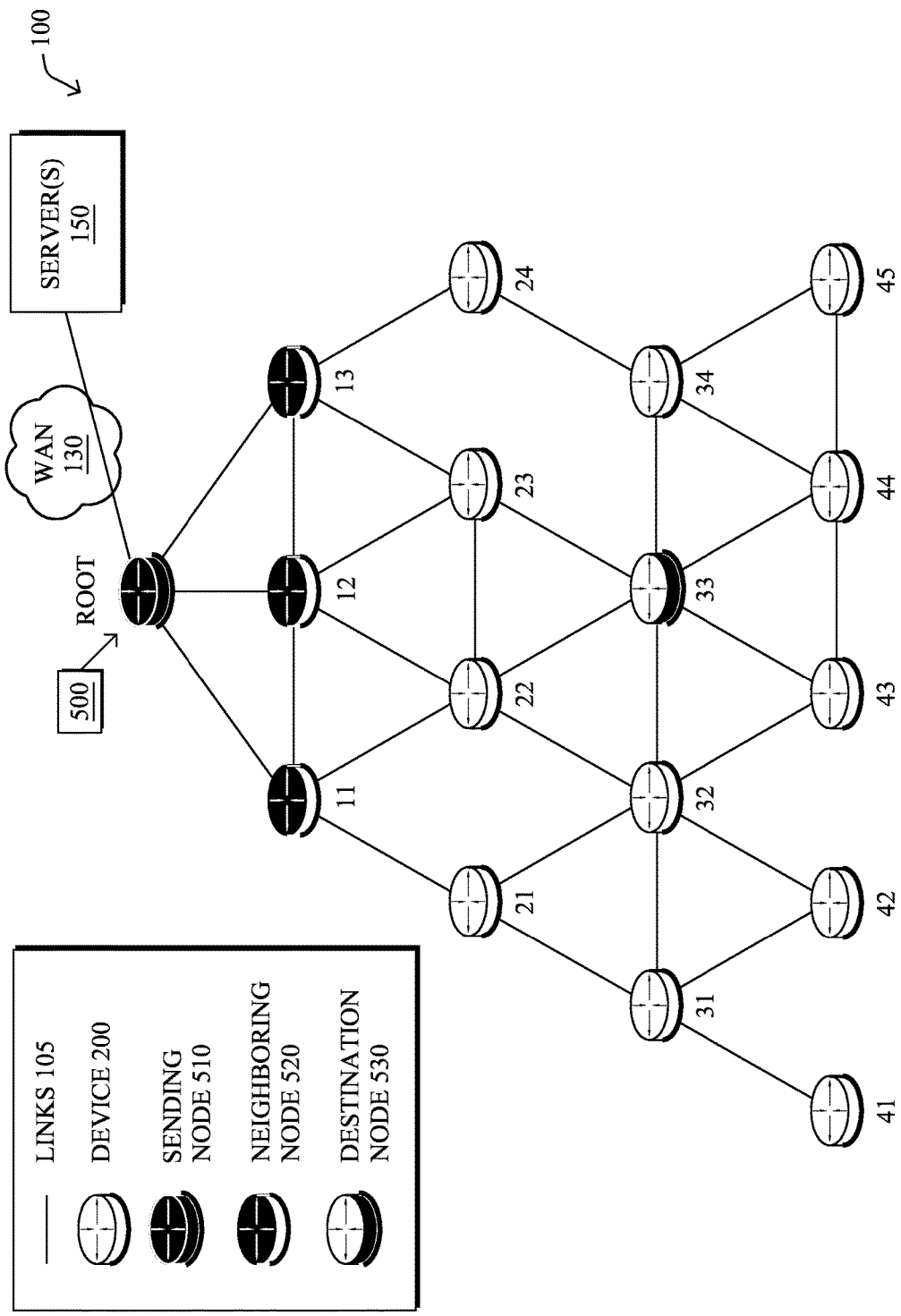
FIG. 5 illustrates a first example routing stage in the network.

FIG. 5 illustrates a first example routing stage in the network. As shown in FIG. 5, a sending node 510 having one or more neighboring nodes 520 is configured to send a data packet 500 to a destination node 530. The route by which the packet 500 will be transmitted from the sending node 510 to the destination node 530 may be determined using the techniques described herein. The sending node 510 may be forwarding the packet 500 which was previously received from another network device, or the sending node 510 may be the source of the packet 500 (i.e., it generated the data packet).

The sending node 510 may determine one or more neighboring nodes 520 that neighbor the sending node 510. The knowledge of neighboring nodes 520 may be stored locally at the sending node 510 (e.g., in a routing table) or otherwise locally determined by the sending node 510. However, it is also possible that the sending node 510 may not know the addresses of the neighboring nodes 520. Therefore, link-layer broadcast communication may be necessary, as it does not require any synchronization to communicate with neighboring devices. Also, the sending node 510 may only be concerned with the one or more neighboring nodes 520 that neighbor the sending node 510 in the direction of the destination node 530 (e.g., where the data packet is directed). This way, each transmission hop taken by the packet 500 can be in a direction toward the destination node 530.

As explained above and with reference to FIGS. 3 and 4, in a channel-hopping network, each node in the network has multiple channels on which a data packet can be received at a particular time according to a channel-hopping receive schedule that is independently computed by each individual device, respectively. A device can synchronize its listening, or "hopping," schedule with another device by communicating its channel sequence, time slot duration, and current time within the schedule. Hopping schedule parameters may be communicated in explicit synchronization packets and/or piggybacked on existing data packets. Some of these parameters (e.g., channel sequence) may be network-wide and implicit, as mentioned above. Devices can store these parameters to know what channel to use for transmission at a particular time.

Figure 6:
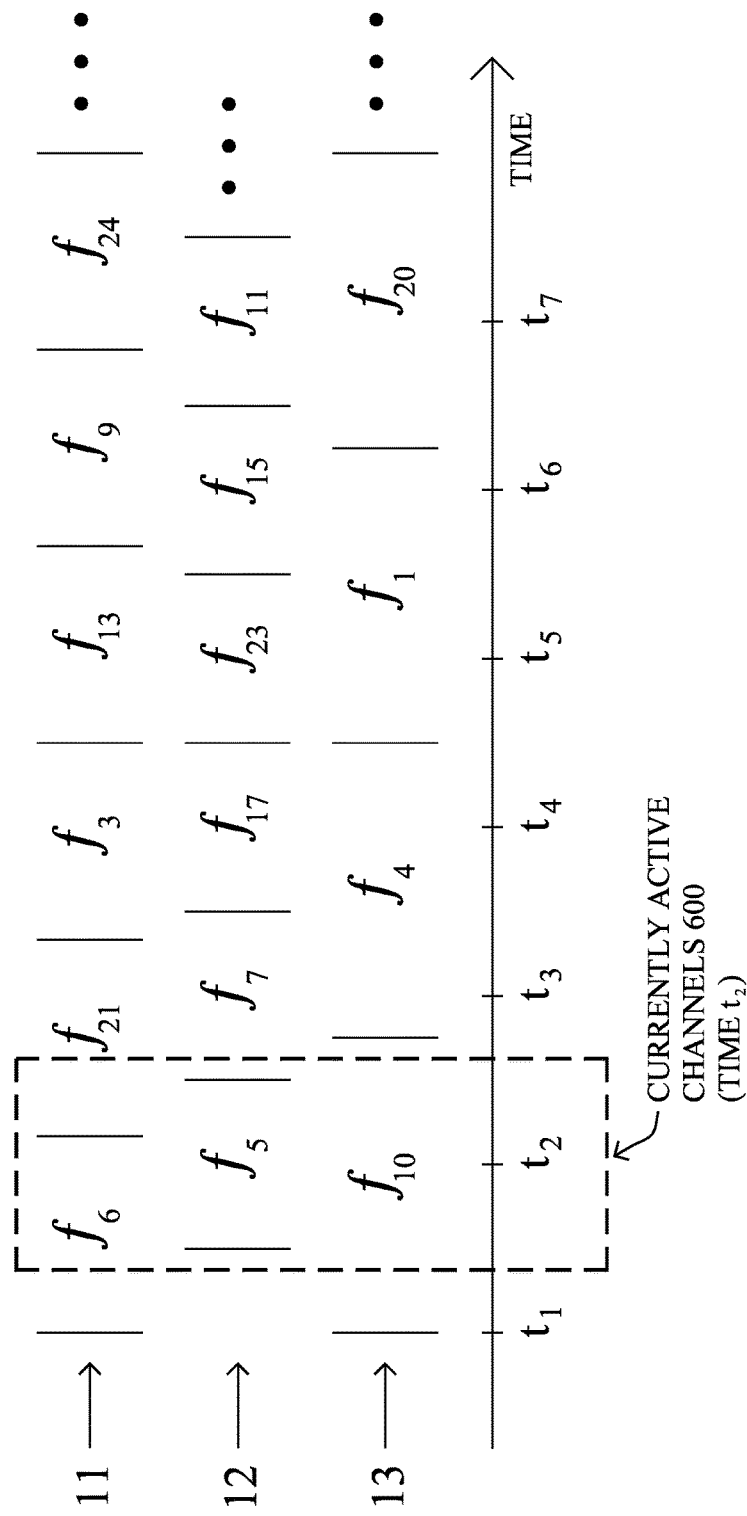
FIG. 6 illustrates first example channel-hopping receive schedules belonging to the neighboring nodes.

FIG. 6 illustrates first example channel-hopping receive schedules belonging to the neighboring nodes. As shown in FIG. 6, channel-hopping receive schedules 400 of the one or more neighboring nodes 520 (e.g., nodes "11", "12" and "13") are independently determined by each node, respectively. The channel-hopping schedules 400 are for demonstration purposes only; however, it is understood that each transmitter-receiver pair may utilize different hopping schedules (i.e., each pair may differ in channel sequence, time slot duration, and/or time base), such that transmitter-receiver pairs may communicate at the same time but on different channels. Moreover, timeslots between different devices can, in fact, be out-of-phase, and may have no relationship with each other (e.g., as shown in FIG. 6). This approach can be preferable at times, as it can add to the overall robustness and versatility of the communication network.

Based on the channel-hopping schedules 400 of each neighboring node 520, a currently active channel 600 of each neighboring node 520 may be determined. The currently active channel 600 is the channel on which a data packet can be received at the current time. For instance, at time $t_2$, the currently active channels 600 for the neighboring nodes "11", "12" and "13" are $f_6$, $f_5$ and $f_{10}$, respectively. For demonstration purposes, FIG. 6 includes a dashed box outlining a time slot region proximate to time $t_2$ indicating channels 600 that will be active at or around time $t_2$. However, it is possible for the active channel of a neighboring node 520 to change very shortly after the current time (and the previously active channel thus becomes inactive). In this case, the active channel 600 of that neighboring node may need to be re-determined. Similarly, when the currently active channel of the neighboring node becomes inactive, the channel quality of the new currently active channel of the neighboring node may need to be computed.

After determining the currently active channels 600 of each neighboring node 520, the sending node 510 may compute a channel quality of the currently active channel of each neighboring node. In this regard, FIG. 7 illustrates a first example scenario of active channel qualities. As shown in FIG. 7, a channel quality of the currently active channel 600 of each neighboring node 520 is computed. As explained, the sending node 510 may maintain per-channel link quality information to each next-hop route towards a destination 530. The sending node 510 may monitor the link quality of the currently active channel 600 of each neighboring node 520 only, or may continuously monitor each channel of the neighboring nodes.

Maintaining a per-channel link quality estimate may be done, for example, by recording the transmission success/failure results for each channel individually. To this end, the sending node 510 may monitor the amount of time needed for transmissions (and retransmissions) to deliver a packet to a neighbor. Also, the sending node 510 may monitor the Estimated Transmission Overhead (ETO) metric, as described above, for each channel to a neighbor. Additionally, the link quality may be monitored using less direct metrics, such as received signal strength indicator (RSSI) and/or link quality indicator (LQI). In general, any metric that allows a device to estimate the channel quality to of a neighboring node on a given channel may be used, such as, for example, an ETX-based metric, channel utilization, an interference range, a transmission success/failure rate, a received signal strength indicator (RSSI)-based metric, a link quality indicator (LQI), a symbol rate, a baud rate, a modulation rate, a bandwidth amount, a bit rate, and the like. Notably, channels with lower channel quality generally require higher transmission overhead.

Referring to FIG. 7, the channel quality of the currently active channels 600 is measured according to the ETX of each channel, where a lower ETX indicates a fewer number of expected transmissions for a packet to be received without error at its destination, and thus, a higher link quality. Illustratively, the currently active channel $f_5$ of neighboring node "12" has the highest active channel quality, since its ETX value is the lowest. As such, the transmission overhead for communicating with each neighboring node can be estimated, as the selected neighboring node minimizes the estimated transmission overhead.

Figure 8:
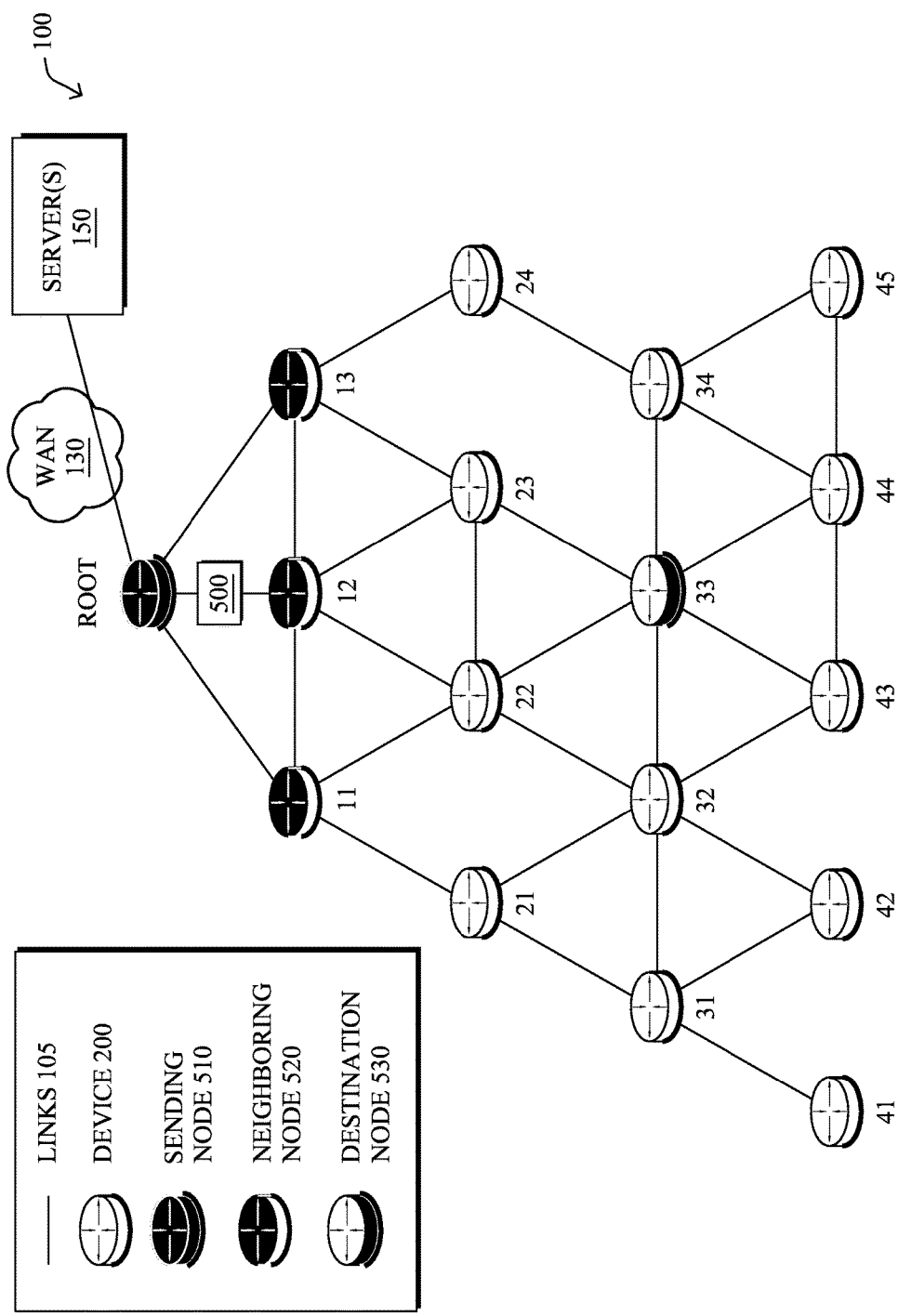
FIG. 8 illustrates a first example next-hop selection based on estimated transmission overhead.

Therefore, as shown in FIG. 8, which illustrates a first example next-hop selection based on estimated transmission overhead, the sending node 510 may select the neighboring node 520 that minimizes the estimated transmission overhead (or maximizes the active channel quality) as the appropriate next-hop neighbor to receive the packet 500. The selection of the neighboring node 520 that minimizes the estimated transmission overhead can be performed in real-time. Since each neighboring node 520 tunes to a different channel (and optionally data rate), the neighboring node 520 that minimizes the transmission overhead, or maximizes the active channel quality, may change every time the channel-hopping dwell-time expires. The packet 500 can then be transmitted to the selected neighboring node (e.g., node "12") accordingly. Note that each network device in the channel-hopping network can define its own channel-hopping schedule (and optionally modulation/symbol rate hopping schedule) for receiving packets. Thus, a device, such as the sending node 510, wishing to send a data packet must use the reception parameters that the receiver (e.g., the selected neighboring node) is currently tuned to.

Figure 9:
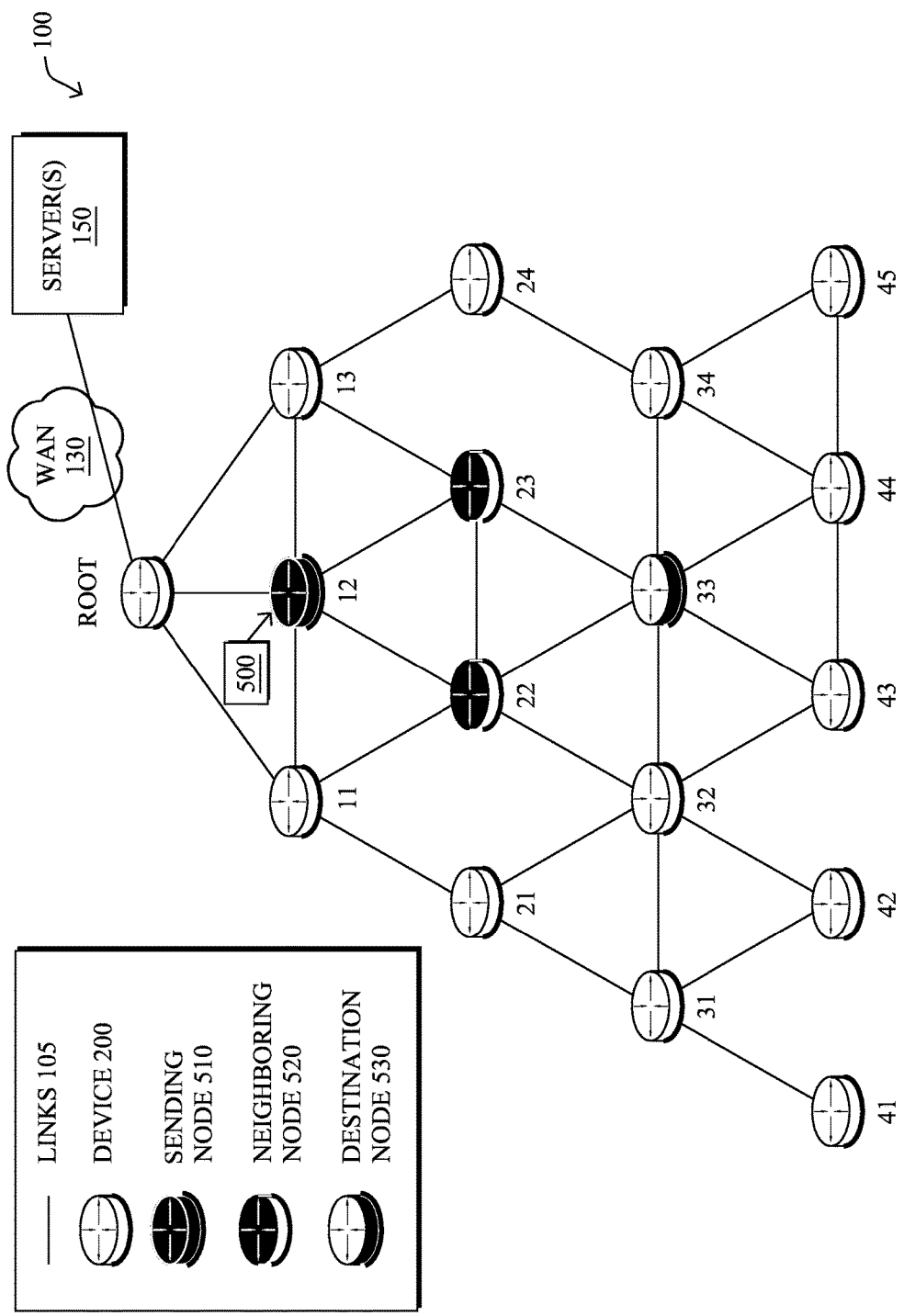
FIG. 9 illustrates a second example routing stage in the network.

Consequently, as shown in FIG. 9, which illustrates a second example routing stage in the network, the packet 500 can be received by the selected neighboring node 520 (e.g., node "12"). At this stage, the node "12", which has possession of the packet 500, can effectively become the new sending node 510 and perform the procedure outlined above to determine another next-hop recipient for the packet 500 on the way to the destination 530. The new sending node 510 can determine that its one or more neighboring nodes 520 include nodes "22" and "23".

Figure 10:
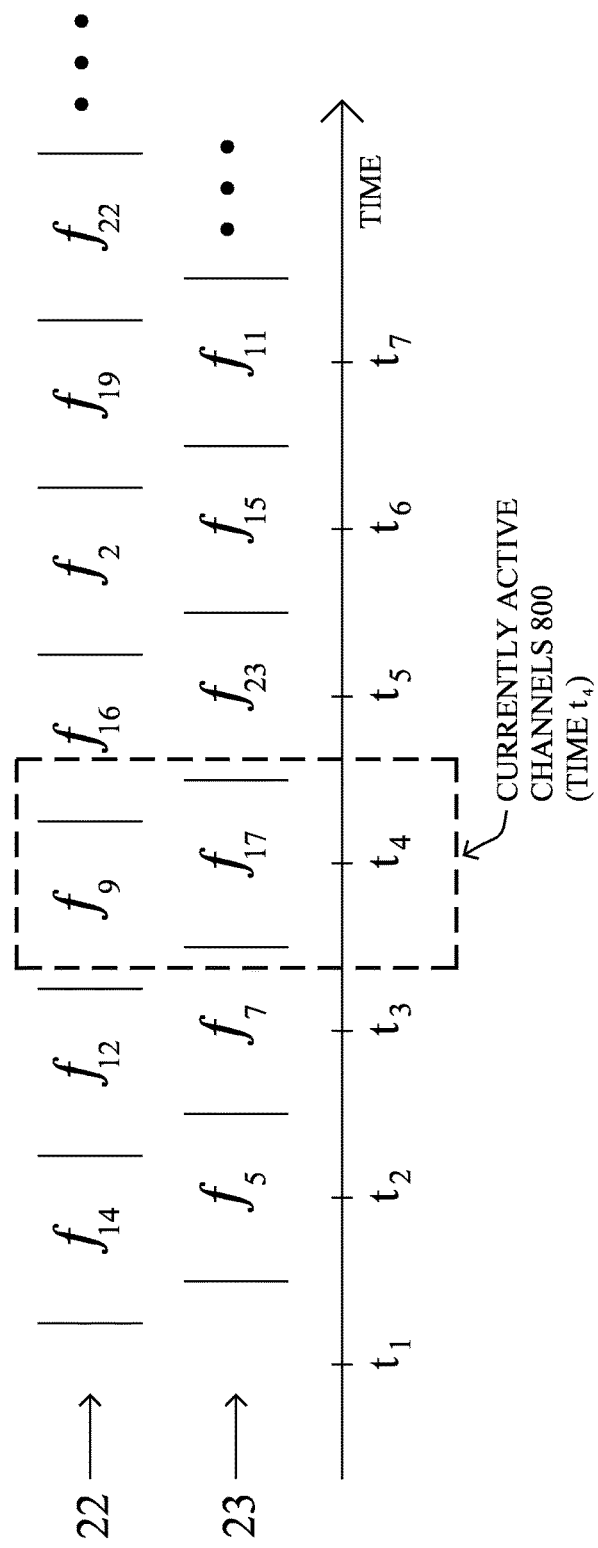
FIG. 10 illustrates second example channel-hopping receive schedules belonging to the neighboring nodes.

FIG. 10 illustrates second example channel-hopping receive schedules belonging to the neighboring nodes. As shown in FIG. 10, channel-hopping receive schedules 400 of the one or more neighboring nodes 520 (e.g., nodes "22" and "23") are independently determined by each node, respectively. Based on the channel-hopping schedules 400 of each neighboring node 520, a currently active channel 800 of each neighboring node 520 may be determined. The currently active channel 800 is the channel on which a data packet can be received at the current time. For instance, continuing the example scenario outlined above, at time $t_4$, the currently active channels 800 for the neighboring nodes "22" and "23" are $f_9$ and $f_{17}$, respectively.

FIG. 11 illustrates a second example scenario of active channel qualities. As shown in FIG. 11, a channel quality of the currently active channel 800 of each neighboring node 520 is computed. As explained, the sending node 510 may maintain per-channel link quality information to each next-hop route towards a destination 530. The sending node 510 may monitor the link quality of the currently active channel 800 of each neighboring node 520 only, or may continuously monitor each channel of the neighboring nodes.

Illustratively, similar to FIG. 7, the channel quality of the currently active channels 800 is measured according to the ETX of each channel, where a lower ETX indicates a fewer number of expected transmissions for a packet to be received without error at its destination, and thus, a higher link quality. Illustratively, the currently active channel $f_9$ of neighboring node "22" has the highest active channel quality, since its ETX value is the lowest. As such, the transmission overhead for communicating with each neighboring node can be estimated, as the selected neighboring node minimizes the estimated transmission overhead.

Figure 12:
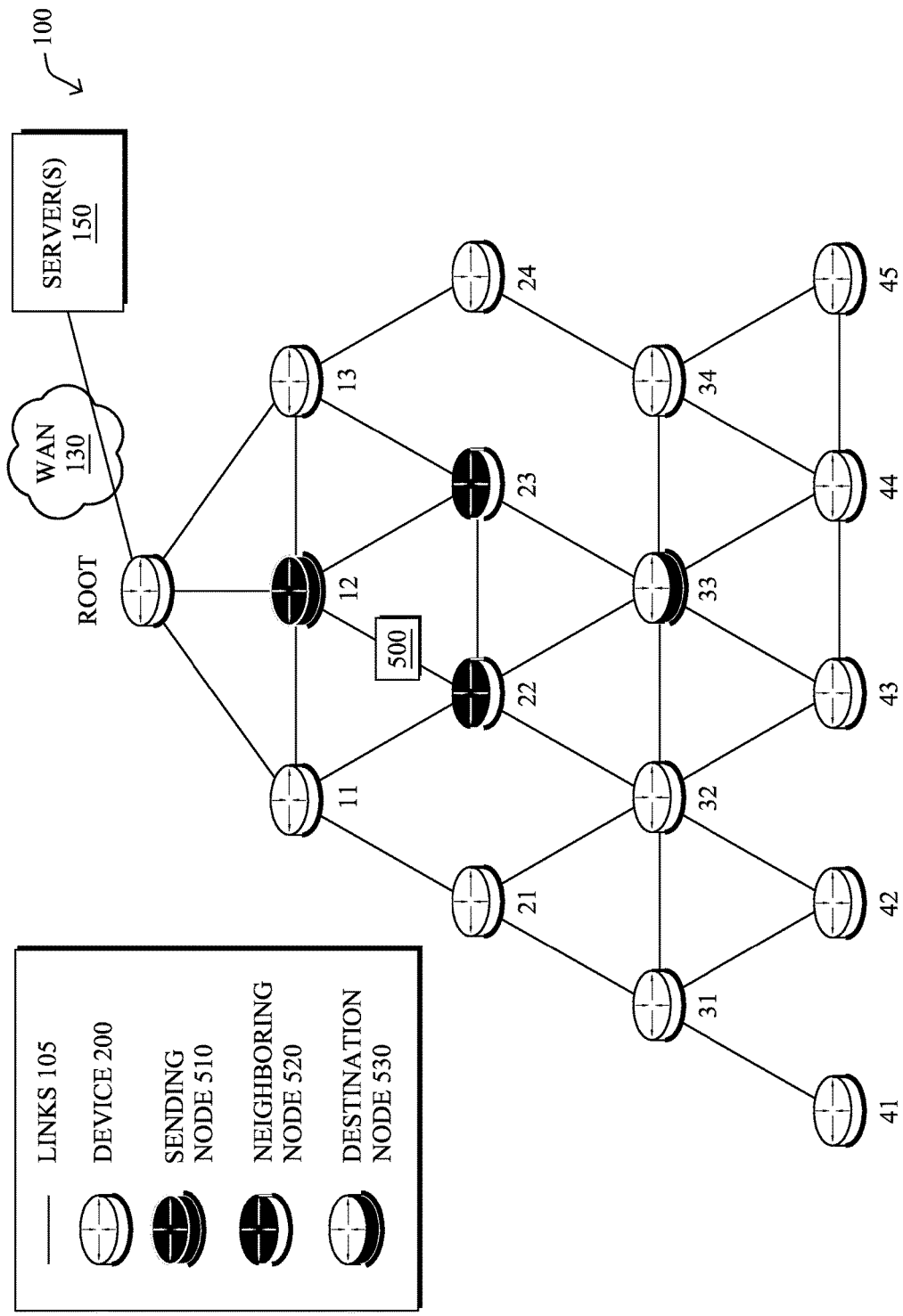
FIG. 12 illustrates a second example next-hop selection based on estimated transmission overhead.

Therefore, as shown in FIG. 12, which illustrates a second example next-hop selection based on estimated transmission overhead, the sending node 510 (e.g., node "12") may select the neighboring node 520 that minimizes the estimated transmission overhead (or maximizes the active channel quality) as the appropriate next-hop neighbor to receive the packet 500. The selection of the neighboring node 520 that minimizes the estimated transmission overhead can be performed in real-time. The packet 500 can then be transmitted to the selected neighboring node (e.g., node "22") accordingly. Note that the sending node 510 must use the reception parameters that the selected neighboring node is currently tuned to.

Figure 13:
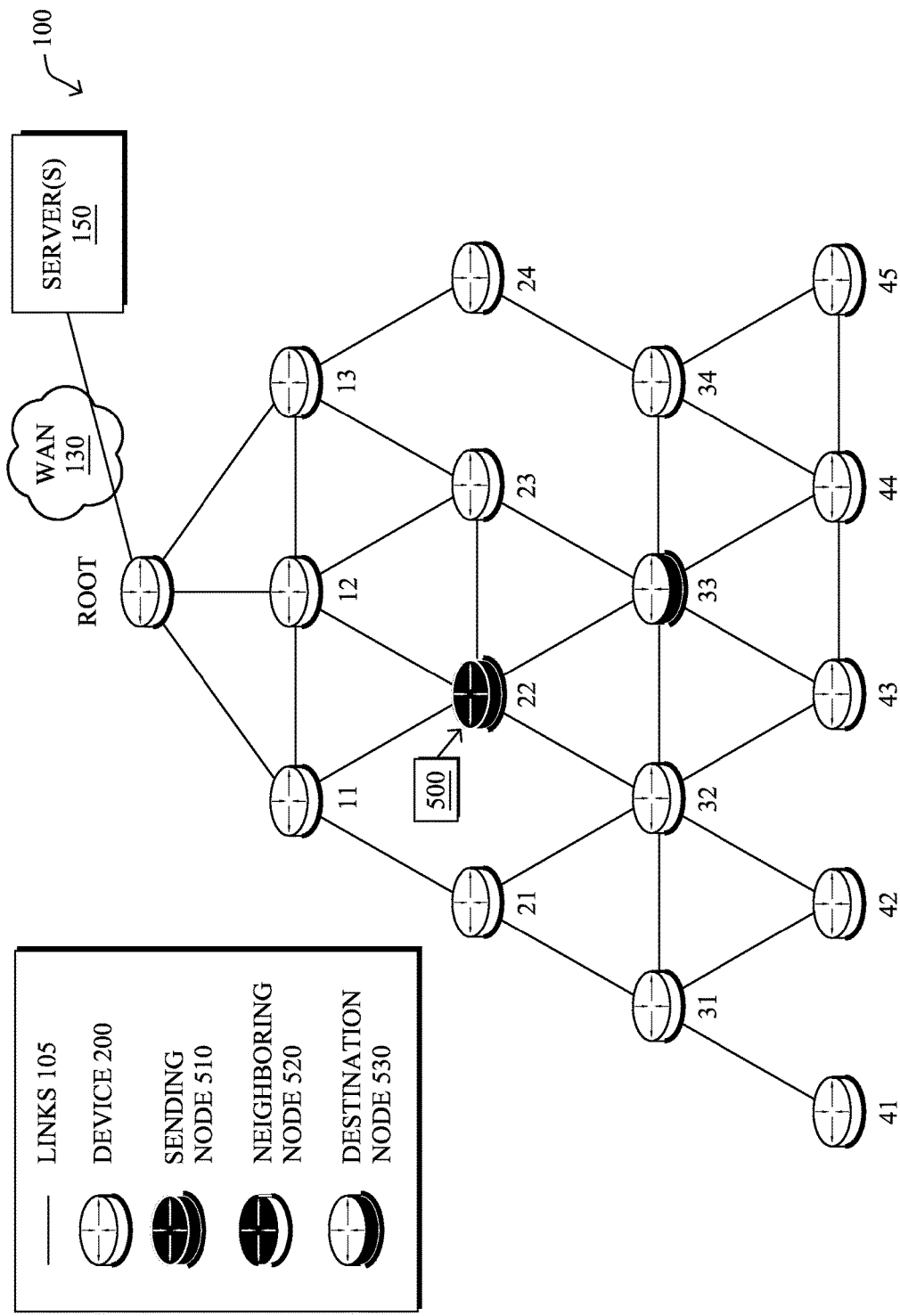
FIG. 13 illustrates a third example routing stage in the network.
Figure 14:
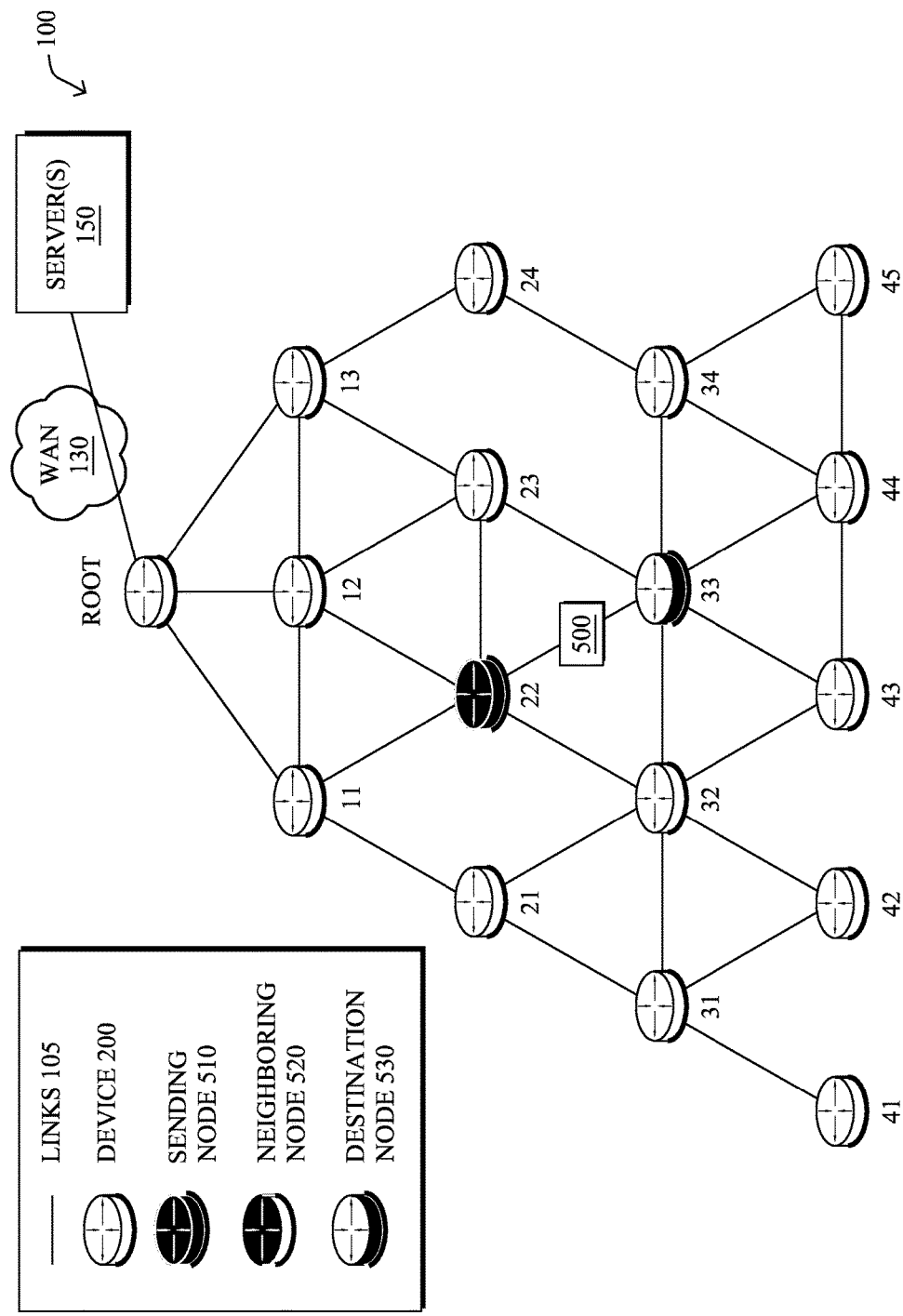
FIG. 14 illustrates an example of delivering a routed packet to a destination.

Consequently, as shown in FIG. 13, which illustrates a third example routing stage in the network, the packet 500 can be received by the selected neighboring node 520 (e.g., node "22"). At this stage, the node "22", which has possession of the packet 500, can effectively become the new sending node 510 and perform the procedure outlined above to determine another next-hop recipient for the packet 500 on the way to the destination 530. However, because the destination node 530 is now only one hop away from the sending node 510 (e.g., node "22"), the sending node 510 may simply send the packet 500 to the destination 530, as shown in FIG. 14. Of course, the sending node 510 must again use the reception parameters that the destination node 530 is currently tuned to.

In addition, a proportion of channels for each neighboring node that are below a channel quality threshold, or so-called "bad" channels, may be calculated. Then, based on the proportion of "bad" channels (i.e., channels below a channel quality threshold), a neighboring node may be selected as the next-hop. The calculated proportion of "bad" channels may also be utilized as a routing metric in the computer network, where, for example, a flag could be set that reports the proportion of "bad" channels for a particular node. This information may then be used to augment the next-hop selection, as the proportion of "bad" channels can indicate the risk of added delays due to attempting to select a better channel.

For instance, where nodes are arranged (upwardly) as A-B-C-D-E Root, A (e.g., the sending node) may select another next hop, e.g., B', instead of B if the next good channel is not available before a given amount of time. In other words, when faced with a bad channel on a first next-hop node, A may select a second next-hop node, rather than waiting for a better channel on the first node. However, it may be possible that B' has a high proportion of very bad channels, still leading to a good ETX overall, but without good alternative next hops. In other words, based on the proportion of bad channels at each node, a new metric could be recorded and used by a node to indicate the average delay (e.g., worst case, minimum, etc.) for the node to find a "good" channel, either following its best next-hop according to the best path selection or thanks to an alternate next-hop.

Such a metric could be recorded periodically (e.g., not for each DIO). As a result, using the bad channel metric, A may avoid selecting B' if it turns out that B' has several bad channels (either via its best next-hop or an alternate next-hop). Such an approach may reduce the risk in following a path that is likely to incur delays due to skipping bad channels, which is critical for delay sensitive networks. Alternatively, the proportion of bad channels may be recorded as a metric in the Root-Node direction (i.e., opposite of above). Accordingly, this information could be piggybacked in DAO messages and used by the root node (e.g., FAR) when building its source route.

Figure 15:
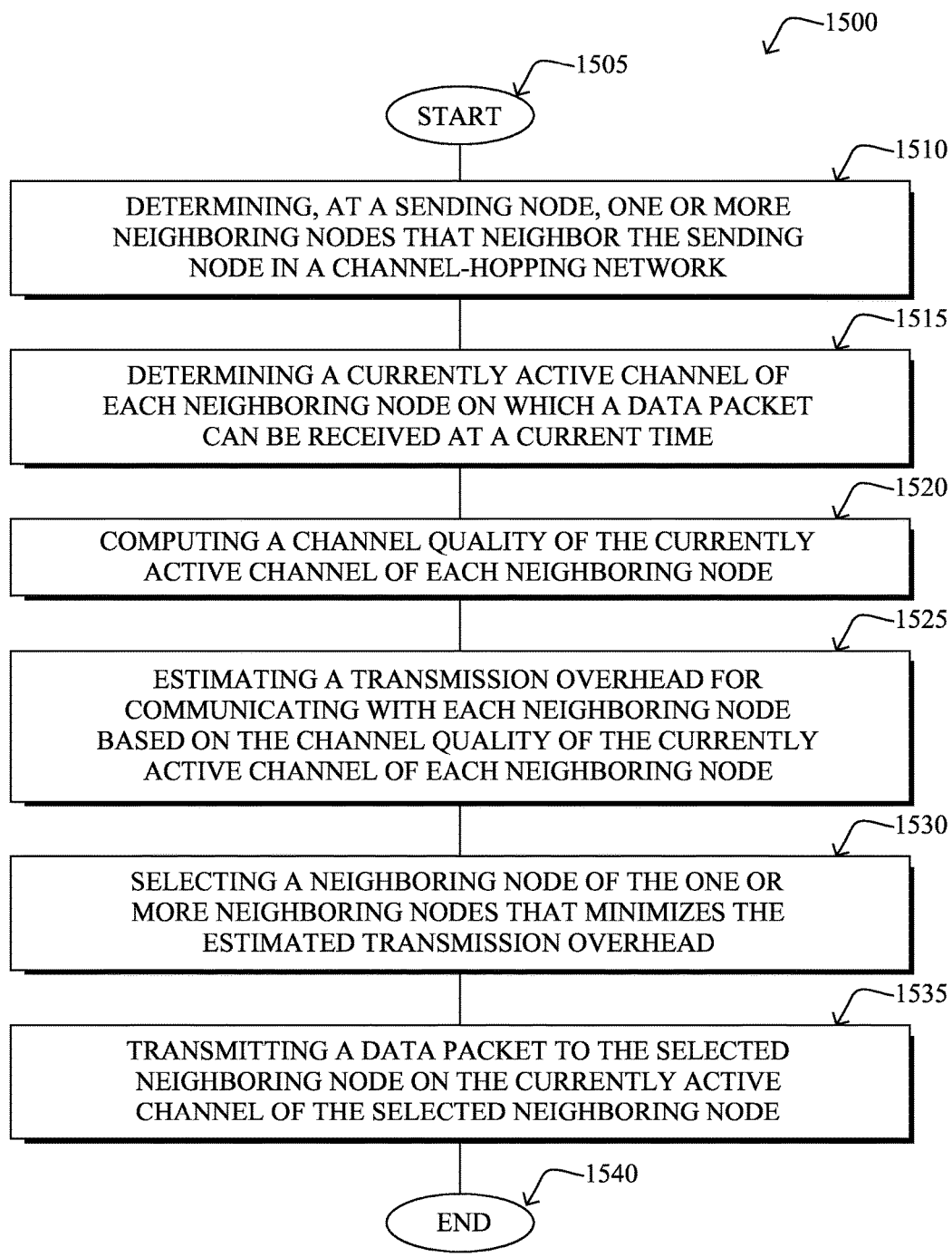
FIG. 15 illustrates an example simplified procedure for real-time route selection based on estimated transmission overhead.

FIG. 15 illustrates an example simplified procedure for real-time route selection based on estimated transmission overhead in accordance with one or more embodiments described herein. The procedure 1500 may start at step 1505, and continues to step 1510, where, as described in greater detail above, the a next-hop node is selected based on a quality of the currently active channels.

At step 1510, one or more neighboring nodes that neighbor a sending node in a channel-hopping network are determined. The determination may be made by a sending node, which may be forwarding the packet 500 which was previously received from another network device, or the sending node 510 may be the source of the packet 500. Each neighboring node has multiple channels on which a data packet can be received at a particular time according to a channel-hopping receive schedule.

At step 1515, a currently active channel of each neighboring node is determined, e.g., by the sending node, where a data packet can be received on the currently active channel at the current time. Based on the channel-hopping schedules of each neighboring node, a currently active channel of each neighboring node may be determined. The currently active channel is the channel on which a data packet can be received at the current time.

At step 1520, a channel quality of the currently active channel of each neighboring node is computed, e.g., by the sending node. As explained above, the sending node may maintain per-channel link quality information to each next-hop route towards a destination, by for example, recording the transmission success/failure results for each channel individually. To this end, the sending node may monitor the amount of time needed for transmissions (and retransmissions) to deliver a packet to a neighbor. Also, the sending node may monitor the ETO metric, as described above, for each channel to a neighbor. Additionally, the link quality may be monitored using less direct metrics, such as RSSI and/or LQI. In general, any metric that allows a device to estimate the channel quality to of a neighboring node on a given channel may be used, such as, for example, an ETX-based metric, channel utilization, an interference range, a transmission success/failure rate, a received signal strength indicator (RSSI)-based metric, a link quality indicator (LQI), a symbol rate, a baud rate, a modulation rate, a bandwidth amount, a bit rate, and the like. Notably, channels with lower channel quality generally require higher transmission overhead.

At step 1525, a transmission overhead for communicating with each neighboring node is estimated, e.g., by the sending node, based on the channel quality of the currently active channel of each neighboring node. Generally speaking, the estimated transmission overhead of communicating over a particular channel increases as the quality of that particular channel decreases, and vice versa.

Then, at step 1530, a neighboring node that provides a path that minimizes the estimated transmission overhead is selected, e.g., by the sending node, based on the computed channel qualities. The selection of the neighboring node that provides a path that minimizes the estimated transmission overhead can be performed in real-time. Since each neighboring node tunes to a different channel (and optionally data rate), the neighboring node that provides a path that minimizes the transmission overhead, or has the highest active channel quality, may change every time the channel-hopping dwell-time expires.

The data packet, at step 1535, can then be transmitted, e.g., from the sending node, to the selected neighboring node on the currently active channel thereof. Because each network device in the channel-hopping network can define its own channel-hopping schedule (and optionally modulation/symbol rate hopping schedule) for receiving packets, a device, such as the sending node, wishing to send a data packet must use the reception parameters that the receiver (e.g., the selected neighboring node) is currently tuned to.

The procedure illustrative ends at step 1540. The techniques by which the steps of procedure 1500 may be performed, as well as ancillary procedures and parameters, are described in detail above.

It should be noted that the steps shown in FIG. 15 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for reducing communication latency and channel utilization when forwarding packets. There are a number of advantages to minimizing transmission overhead in real-time. First, doing so reduces the end-to-end latency when forwarding a given packet, since each hop attempts to minimize the latency across that link. Second, because a device minimizes the amount of time spent forwarding a given packet, the device can more quickly service subsequent (and potentially higher priority) packets. Third, because a device minimizes transmission overhead, a device is also minimizing overall channel utilization on a shared medium providing greater capacity to other neighboring devices. Overall, the embodiments disclosed herein reduce communication latency, channel utilization, and improves overall network capacity.

While there have been shown and described illustrative embodiments that provide for real-time route selection based on estimated transmission overhead, it is to be understood that various other adaptations and modifications may be made within the spirit and scope of the embodiments herein. For example, the embodiments have been shown and described herein with relation to LLNs. However, the embodiments in their broader sense are not as limited, and may, in fact, be used with other types of networks and/or protocols. In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as an apparatus that comprises at least one network interface that communicates with a communication network, a processor coupled to the at least one network interface, and a memory configured to store program instructions executable by the processor. Further, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, at a sending node, one or more neighboring nodes that neighbor the sending node in a channel-hopping network, each link to each neighboring node having multiple channels on which a data packet can be received at a particular time according to a channel-hopping receive schedule, wherein the multiple channels are multiple frequencies;
   determining a currently active channel of each neighboring node on which a data packet can be received at a current time;
   computing a channel quality of the currently active channel of each neighboring node;
   estimating a transmission overhead for communicating with each neighboring node based on the channel quality of the currently active channel of each neighboring node;
   maintaining per-channel transmission overhead estimates for each currently active channel of each neighboring node of the one or more neighbor nodes;
   selecting a neighboring node of the one or more neighboring nodes that minimizes the estimated transmission overhead based on the maintained per-channel transmission overhead estimates; and
   transmitting a data packet to the selected neighboring node on the currently active channel of the selected neighboring node.

2. The method as in claim 1, wherein the selected neighboring node has the highest active channel quality.

3. The method as in claim 1, wherein the selected neighboring node is an intermediate node in a transmission route of a particular data packet, which was originated at a source node and directed to a destination node.

4. The method as in claim 3, wherein in response to receiving a particular data packet, the selected neighboring node forwards a particular data packet to another node toward the destination node.

5. The method as in claim 1, wherein the transmitting of a particular data packet to the selected neighboring node comprises:
   receiving a particular data packet from another node in the channel-hopping network; and
   forwarding a particular data packet to the selected neighboring node.

6. The method as in claim 1, wherein the determining of the one or more neighboring nodes that neighbor the sending node comprises:
   determining one or more neighboring nodes that neighbor the sending node in a direction of a destination node to which a particular data packet is directed.

7. The method as in claim 1, further comprising:
   monitoring a channel quality of each channel of the one or more neighboring nodes.

8. The method as in claim 1, wherein the computing of the channel quality of the currently active channel of each neighboring node comprises:
   computing one or more channel quality metrics of the currently active channel of each neighboring node,
   wherein the one or more channel quality metrics include one or more of: time required for a transmission to successfully reach a particular neighboring node, an expected transmission count (ETX)-based metric, channel utilization, an interference range, a transmission success/failure rate, a received signal strength indicator (RSSI)-based metric, a link quality indicator (LQI), a symbol rate, a baud rate, a modulation rate, a bandwidth amount, and a bit rate.

9. The method as in claim 1, further comprising:
   re-computing a channel quality of a new currently active channel of a neighboring node when the currently active channel of the neighboring node becomes inactive.

10. The method as in claim 1, further comprising:
    calculating a proportion of channels below a channel quality threshold for each neighboring node; and
    selecting the neighboring node of the one or more neighboring nodes based further on the proportion of channels below the channel quality threshold for each neighboring node.

11. The method as in claim 10, wherein the calculating of the proportion of channels below the channel quality threshold is performed at a plurality of nodes in the channel-hopping network, so as to create channel information at each of the plurality of nodes, and routing decisions are made in the channel-hopping network based on the channel information at each of the plurality of nodes.

12. The method as in claim 1, wherein the selecting of the neighboring node and the transmitting of a particular data packet to the selected neighboring node on the currently active channel of the selected neighboring node is performed in real-time.

13. An apparatus, comprising:
    one or more network interfaces to communicate with a channel-hopping network;
    a processor coupled to the one or more network interfaces and adapted to execute a process; and a memory configured to store program instructions which include the process executable by the processor, the process comprising:
- determining, as a sending node, one or more neighboring nodes that neighbor the sending node in the channel-hopping network, each link to each neighboring node having multiple channels on which a data packet can be received at a particular time according to a channel-hopping receive schedule, wherein the multiple channels are multiple frequencies;
- determining a currently active channel of each neighboring node on which a data packet can be received at a current time;
- computing a channel quality of the currently active channel of each neighboring node;
- estimating a transmission overhead for communicating with each neighboring node based on the channel quality of the currently active channel of each neighboring node;
- maintaining per-channel transmission overhead estimates for each currently active channel of each neighboring node;
- selecting a neighboring node of the one or more neighboring nodes that minimizes the estimated transmission overhead; and
- transmitting a data packet to the selected neighboring node on the currently active channel of the selected neighboring node.

14. The apparatus as in claim 13, wherein the selected neighboring node has the highest active channel quality.

15. The apparatus as in claim 13, wherein the selected neighboring node is an intermediate node in a transmission route of a particular data packet, which was originated at a source node and directed to a destination node.

16. The apparatus as in claim 15, wherein in response to receiving a particular data packet, the selected neighboring node forwards a particular data packet to another node toward the destination node.

17. The apparatus as in claim 13, wherein the transmitting of a particular data packet to the selected neighboring node comprises:
- receiving a particular data packet from another node in the channel-hopping network; and
- forwarding a particular data packet to the selected neighboring node.

18. The apparatus as in claim 13, wherein the determining of the one or more neighboring nodes that neighbor the sending node comprises:
- determining one or more neighboring nodes that neighbor the sending node in a direction of a destination node to which a particular data packet is directed.

19. The apparatus as in claim 13, wherein the process further comprises:
- monitoring a channel quality of each channel of the one or more neighboring nodes.

20. The apparatus as in claim 13, wherein the computing of the channel quality of the currently active channel of each neighboring node comprises:
- computing one or more channel quality metrics of the currently active channel of each neighboring node, wherein
- the one or more channel quality metrics include one or more of: time required for a transmission to successfully reach a particular neighboring node, an expected transmission count (ETX)-based metric, channel utilization, an interference range, a transmission success/failure rate, a received signal strength indicator (RSSI)-based metric, a link quality indicator (LQI), a symbol rate, a baud rate, a modulation rate, a bandwidth amount, and a bit rate.

21. The apparatus as in claim 13, wherein the process further comprises:
- re-computing a channel quality of a new currently active channel of a neighboring node when the currently active channel of the neighboring node becomes inactive.

22. The apparatus as in claim 13, wherein the process further comprises:
- calculating a proportion of channels below a channel quality threshold for each neighboring node; and
- selecting the neighboring node of the one or more neighboring nodes based further on the proportion of channels below the channel quality threshold for each neighboring node.

23. The apparatus as in claim 22, wherein the calculating of the proportion of channels below the channel quality threshold is performed at a plurality of nodes in the channel-hopping network, so as to create channel information at each of the plurality of nodes, and routing decisions are made in the channel-hopping network based on the channel information at each of the plurality of nodes.

24. The apparatus as in claim 13, wherein the selecting of the neighboring node and the transmitting of a particular data packet to the selected neighboring node on the currently active channel of the selected neighboring node is performed in real-time.

25. A tangible non-transitory computer readable medium storing program instructions that cause a computer to execute a process, the process comprising:
- determining, at a sending node, one or more neighboring nodes that neighbor the sending node in a channel-hopping network, each link to each neighboring node having multiple channels on which a data packet can be received at a particular time according to a channel-hopping receive schedule, wherein the multiple channels are multiple frequencies;
- determining a currently active channel of each neighboring node on which a data packet can be received at a current time;
- computing a channel quality of the currently active channel of each neighboring node;
- estimating a transmission overhead for communicating with each neighboring node based on the channel quality of the currently active channel of each neighboring node;
- maintaining per-channel transmission overhead estimates for each currently active channel of each neighboring node;
- selecting a neighboring node of the one or more neighboring nodes that minimizes the estimated transmission overhead based on the maintained per-channel transmission overhead estimates; and
- transmitting a data packet to the selected neighboring node on the currently active channel of the selected neighboring node.

* * * * *